United States Patent
Taylor et al.

(12)

(10) Patent No.: US 6,405,988 B1
(45) Date of Patent: Jun. 18, 2002

(54) ANCHOR ASSEMBLY

(75) Inventors: Alexander Thomas Taylor, Wednesfield; Rodger Gordon Smith, Ludlow; Pacho Leon, Essex, all of (GB)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/718,450

(22) Filed: Nov. 22, 2000

(30) Foreign Application Priority Data

Nov. 26, 1999 (GB) .............................................. 9927855

(51) Int. Cl.[7] .......................... F16M 11/00; B60N 2/07
(52) U.S. Cl. .................. 248/429; 296/65.13; 296/65.03
(58) Field of Search .......................... 296/65.03, 65.11, 296/65.13; 248/429, 503.1

(56) References Cited

U.S. PATENT DOCUMENTS 3,120,371 A * 2/1964 Dall ...................... 248/430 X
3,259,354 A * 7/1966 Dall ........................... 248/429
6,145,913 A * 11/2000 Odagaki .............. 296/65.03 X

FOREIGN PATENT DOCUMENTS

| AT | 112214 | * | 2/1929 | .................. 248/429 |
| EP | 0618102 A1 | | 3/1994 | |
| GB | 17226 | * | 7/1914 | .................. 248/429 |
| GB | 261460 | * | 11/1926 | .................. 248/429 |

* cited by examiner

Primary Examiner—Dennis H. Pedder
(74) Attorney, Agent, or Firm—Foley & Lardner

(57) ABSTRACT

An anchor assembly is suitable for releaseably and adjustably securing a vehicle seat to the floor of a vehicle. The anchor assembly includes an anchor unit that in use is secured to the floor of the vehicle and a lock unit that in use is secured to the base of the vehicle seat. The lock unit cooperates with an anchor member in the anchor unit so that 1) the position of the vehicle seat can be adjusted by sliding the lock unit along the anchor member, 2) the lock unit can be secured in at least one predetermined adjustment position, and 3) the lock unit can be released from the anchor unit in at least one predetermined release position.

19 Claims, 5 Drawing Sheets

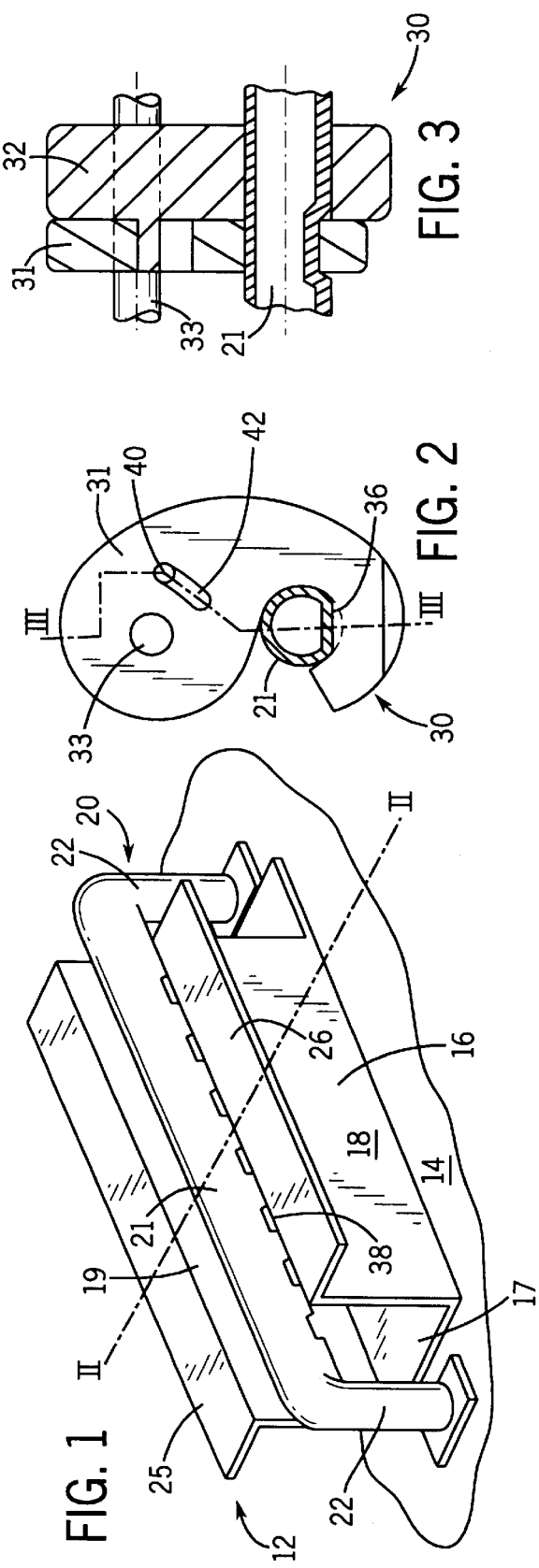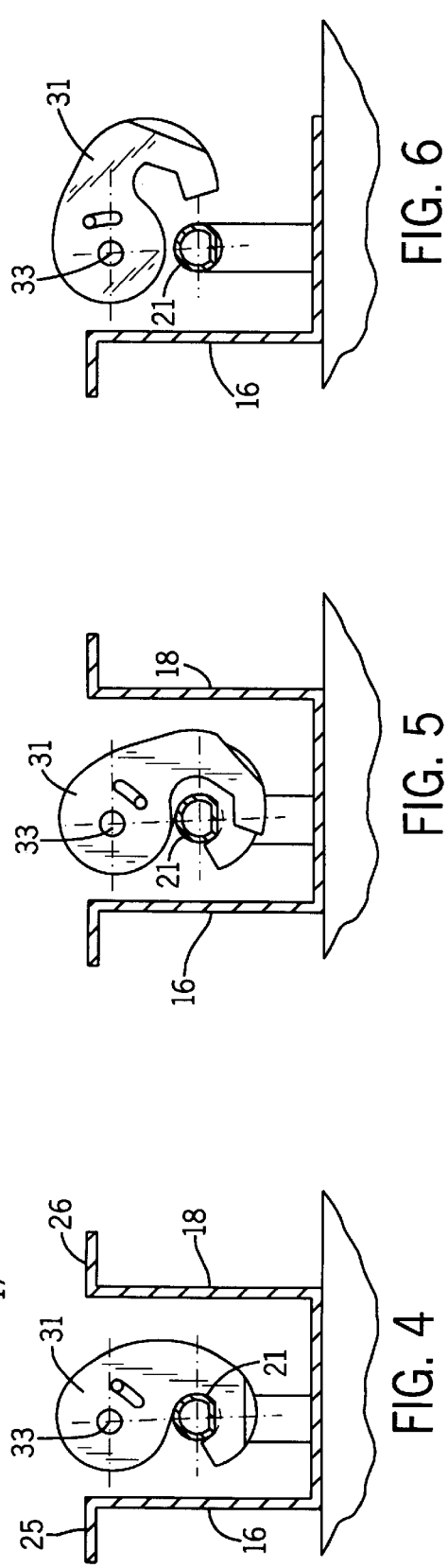

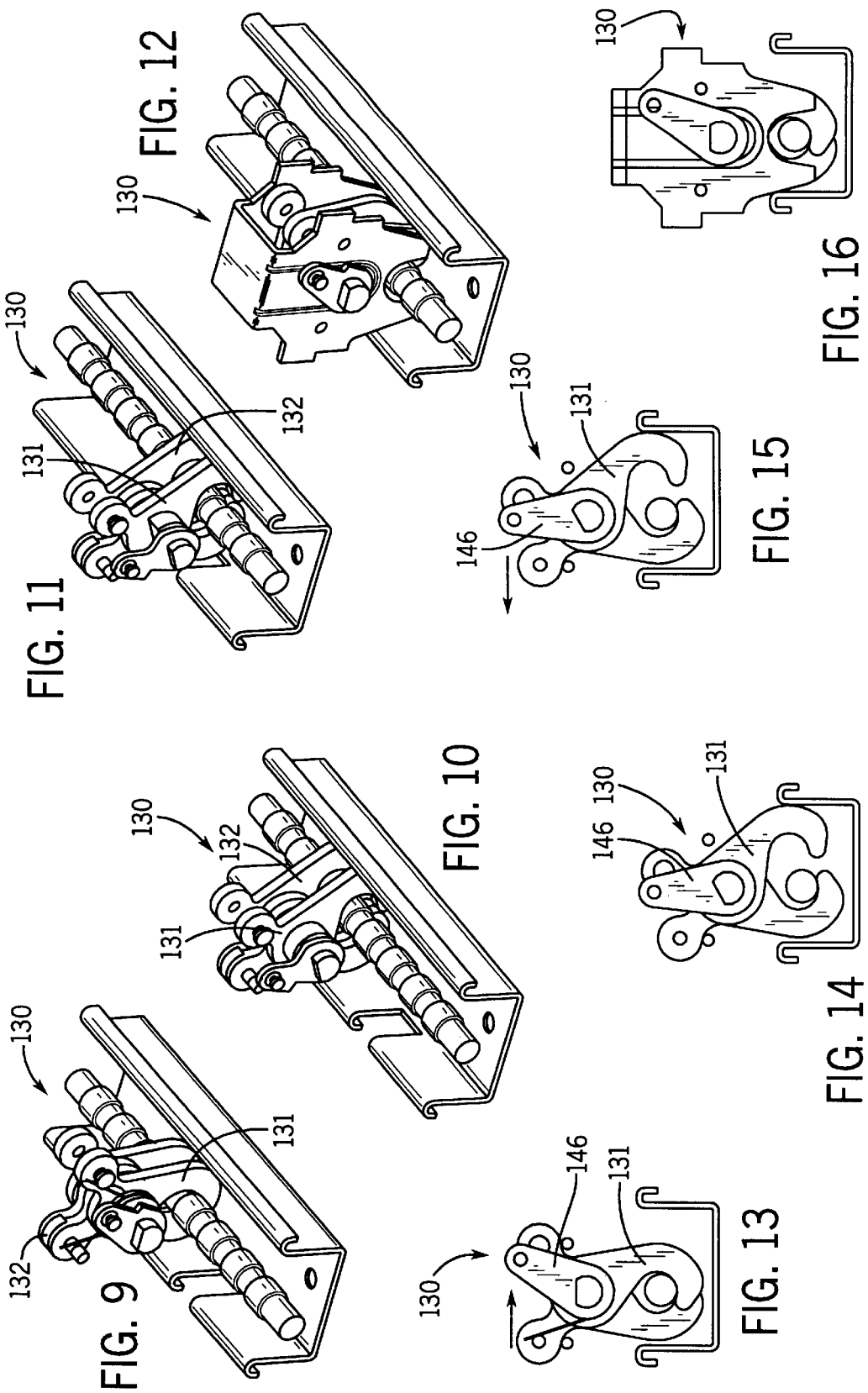

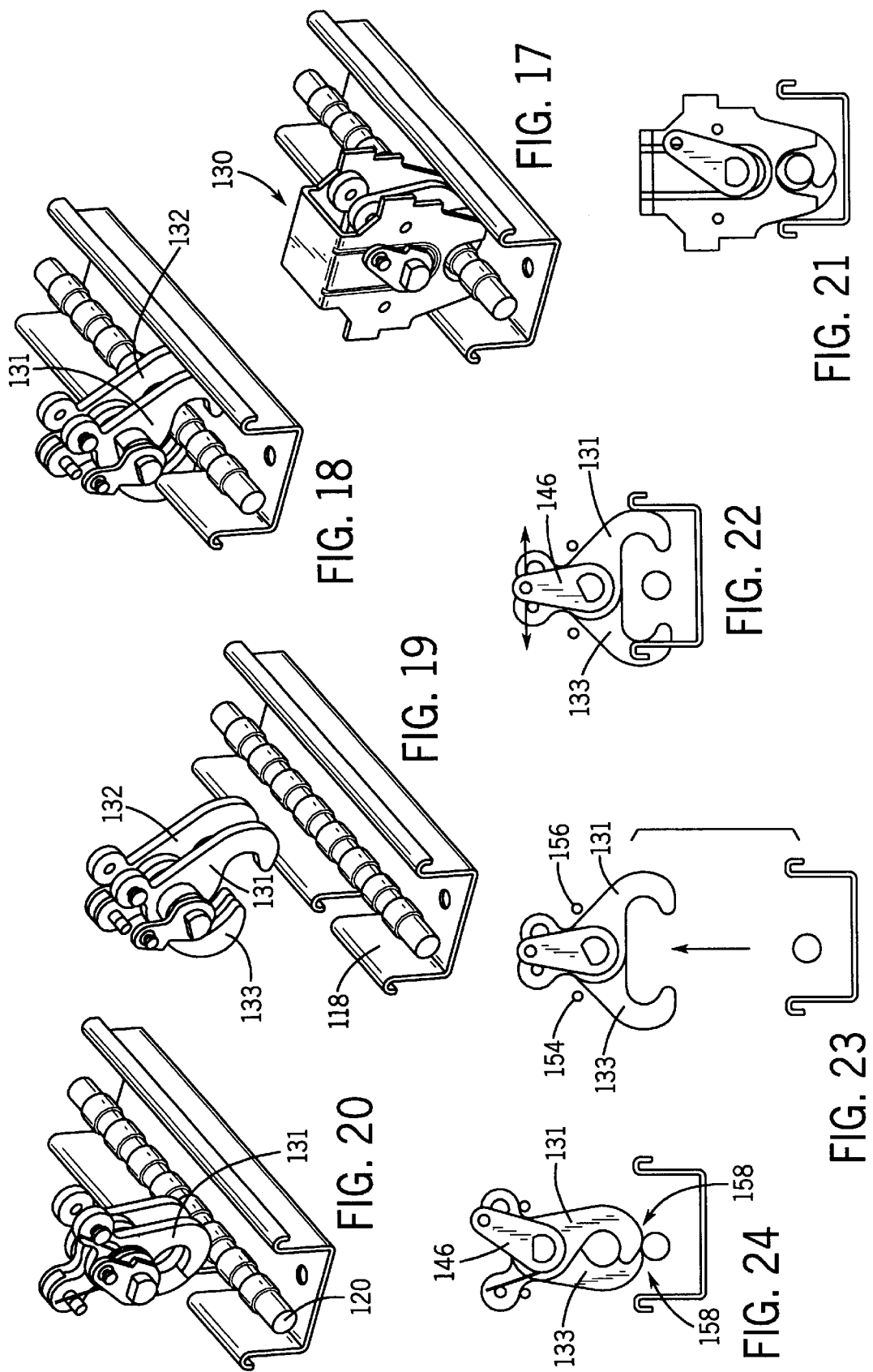

ANCHOR ASSEMBLY

The invention relates to an anchor assembly, in particular, but not exclusively, an anchor assembly for releaseably connecting a vehicle seat to the floor of a vehicle body.

An aim of the invention is to provide an anchor assembly for a vehicle seat that enables the seat to be slidably adjusted between predetermined fixed positions. It is also an aim of the invention to provide an anchor assembly that enables a vehicle seat to be releaseably connected to the floor of a vehicle body, so allowing the seat to be tilted or folded, or removed completely from the floor of the vehicle.

According to one aspect of the invention, there is provided an anchor assembly suitable for releaseably and adjustably securing a vehicle seat to the floor of a vehicle, comprising:

an anchor unit that in use is secured to the floor of the vehicle; and a lock unit that in use is secured to the base of the vehicle seat; wherein the lock unit co-operates with an anchor member in the anchor unit so that:

the position of the vehicle seat can be adjusted by sliding the lock unit along the anchor member;

the lock unit can be secured in at least one predetermined adjustment position; and the lock unit can be released from the anchor unit in at least one predetermined release position.

The anchor assembly of the invention provides a mechanism for securing a vehicle seat to the floor of a vehicle in such a manner that the position of the seat may be adjusted, and it may be secured in at least one predetermined adjustment position. The anchor assembly also allows the seat to be detached or removed from the floor of the vehicle when required.

The lock unit that in use is secured to the base of the vehicle seat may be provided with at least two pivotally mounted lock members. In use, such lock members are arranged to co-operate with the anchor member in the anchor unit.

The anchor member in the anchor unit may be provided with one or a number of recesses. When the lock unit includes at least two lock members, at least one of these lock members may be pivotal in and out of engagement with the or a recess on the anchor member. This allows the lock unit to be releaseably secured in at least one predetermined adjustment position on the anchor member.

During sliding movement of the lock unit along the anchor member, at least one of the lock members may co-operate with the anchor member to retain the lock unit in co-operation with the anchor member during sliding movement of the lock unit along the anchor member, unless the lock unit is located at a predetermined release position. This arrangement ensures that the seat does not detach from the floor of the vehicle, such as in a tipping action, except when specifically desired.

The anchor member is preferably an elongate rod that may be provided with a plurality of recesses equidistantly spaced along the length of the elongate rod.

The anchor unit that in use is secured to the floor of the vehicle may also include a generally U-shaped elongate channel member provided with a base and upstanding walls. The anchor member in the form of an elongate bar may be located so that it extends longitudinally through and along the interior region of the elongate channel member, spaced from the channel's base and upstanding walls.

The elongate channel member may be secured to the floor of a vehicle by any suitable means. Such attachment means include bolts, rivets and/or welding.

The elongate rod may be secured to the floor of a vehicle by two legs. These legs may be fixedly secured to the floor of the vehicle by means such as bolts or welding.

In an embodiment of the invention, at least one lock member may be retained in co-operation with the anchor member during sliding movement of the lock unit along the anchor member in the form of an elongate bar, by at least one upstanding wall of the elongate channel member. In a further embodiment, all of the lock members may be retained in co-operation with the elongate bar by at least one of the upstanding walls of the elongate channel member.

In such embodiments, a predetermined release position may be defined by a cutaway portion in an upstanding wall of the elongate channel member that otherwise retains at least one of the lock members in co-operation with the elongate rod. Such a cutaway portion allows all of the lock members to be pivoted out of co-operation with the elongate rod, releasing the lock member, and hence detaching the vehicle seat to which the lock unit is attached from the floor of the vehicle.

The upstanding walls of the elongate channel member may be provided with outwardly extending flanges. These flanges provide a bearing support upon which a vehicle seat can be slidably seated.

In a particular embodiment of the invention, the lock unit is provided with at least two lock members, where each lock member is in the form of a hook. These hooks may be mounted on a pivot shaft, the pivot shaft being arranged to lie parallel to the anchor member.

At least one of the hooks, that is releasably engageable within the or a recess on the anchor member, may be provided with a projection so that when the hook is pivoted into engagement with the or a recess the projection engages within the recess.

The hooks may also be coupled together. One of the hooks may include a projection that projects outwardly from a side face of the hook that is adjacent to a side face of another hook, and extends through an arcuate slot through the or each other hook.

The arcuate slot allows a certain amount of free play in the movement of at least one of the hooks, without causing the at least one other hook to move.

In another particular embodiment of the invention, the lock unit includes four lock members, each in the form of a hook, pivotally mounted on a pivotal axis within a lock unit body housing.

The lock unit body housing may include hook stops that determine the maximum amount of rotation of the hooks about the pivotal axis.

The hooks may be spring biased relative to each other. Such a spring bias may be provided by a torsion spring.

To further ensure that at least two of the hooks are retained in co-operation with the anchor member during sliding movement of the lock unit along the anchor member, a face of each of the relevant hooks that co-operates with the anchor member may be provided with a negative taper angle.

The hooks may be mounted on a pivot shaft that has a cross-sectional shape that corresponds to the shape of the apertures through which the pivot shaft extends in two of the hooks. The shape of the apertures through which the pivot shaft extends in the other two hooks is preferably circular.

The cross-sectional shape of the pivot shaft and the correspondingly shaped apertures in the hooks are preferably generally D-shaped. Due to the relative shapes of the pivot shaft's cross-section and the apertures in the hooks, rotation of the pivot shaft causes the two hooks with correspondingly shaped apertures to rotate, whilst the other two hooks remain unaffected.

A cable puller may be located on the pivot shaft to provide means to rotate the pivot shaft and so pivot the two hooks with correspondingly shaped apertures in and out of engagement with a recess on the anchor member. A cable may be attached directly to the other two hooks to provide means to pivot them about the pivot shaft.

Preferred embodiments of the invention will now be described, by way of example, with reference to the accompanying drawings, in which:

FIG. 1 is a perspective view of an anchor unit forming part of an anchor assembly according to a first embodiment of the invention;

FIG. 2 is a sectional end view of the unit shown in FIG. 1 taken along the line II—II and incorporating a lock unit forming part of the anchor assembly;

FIG. 3 is a sectional view taken along the line III—III in FIG. 2;

FIGS. 4, 5 and 6 are sectional views similar to FIG. 2 showing the anchor assembly in different modes of operation;

FIGS. 9 to 12 are perspective views of the anchor assembly of FIG. 7 in different modes of operation;

FIGS. 13 to 16 are sectional end views of the anchor assembly shown in each of FIGS. 9 to 12.

FIGS. 17 to 20 are perspective views of the anchor assembly of FIG. 7 in different modes of operation; and FIGS. 21 to 24 are sectional end views of the anchor assembly shown in each of FIGS. 17 to 20.

Figure 7:
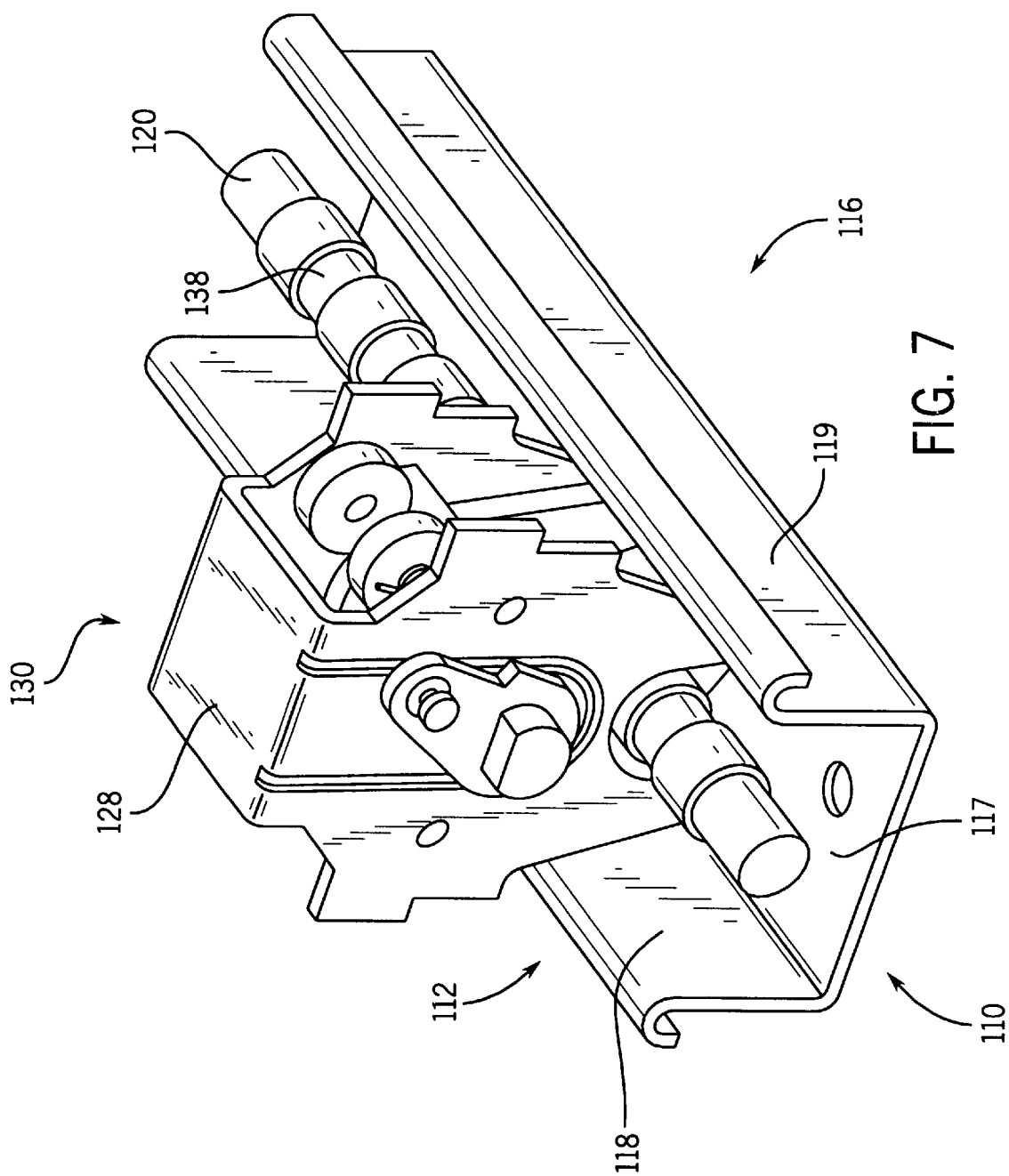
FIG. 7 is a perspective view of an anchor assembly according to a second embodiment of the invention.

An anchor assembly 10 according to an embodiment of the invention includes an anchor unit 12 that in use is fixed to the floor 14 of a vehicle body, and a lock unit 30 that in use is mounted on the underside of a vehicle seat.

An anchor unit 12 according to a first embodiment of the invention is shown in FIG. 1. The anchor unit 12 shown in this figure includes a generally U-shaped, elongate channel member 16 having a base 17 and opposed upstanding walls 18, 19.

The elongate channel member 16 is fixedly secured to the floor 14 of a vehicle. This is preferably achieved by securing the base 17 to the floor 14 by any convenient fixing technique. For example, the base 17 may be secured by bolt, rivets and/or welding.

The anchor unit 12 also includes an anchor member 20. The anchor member 20 is located within the elongate channel member 16 and is also fixedly connected to the floor 14.

The anchor member 20 has an elongate body portion 21 that is secured at each end to the floor 14 via legs 22. The legs 22 can be fixedly secured to the floor 14 by any suitable fixing means such as bolts or welding.

The legs 22 not only fixedly secure the body portion 21 to the floor 14, but they also position the body portion 21 such that it extends longitudinally along an interior region of the elongate channel member 16, being spaced from the base 17 and the side walls 18, 19.

Each of the upstanding walls 18, 19 of the elongate channel member 16 is provided with an outwardly extending support flange 25, 26. These flanges 25, 26 are preferably provided on the upper edges of the upstanding walls 18, 19 to provide a bearing support surface upon which a vehicle seat (not shown) may be slidingly seated. If desired, the upper surfaces of each of the flanges 25, 26 may be provided with a low friction coating to facilitate sliding movement of the seat.

A lock unit 30 is shown in FIGS. 2 and 3. The lock unit 30 includes a stop hook 31 and a safety hook 32 that are preferably pivotally mounted side-by-side on a common pivot shaft 33. The pivot shaft 33 is secured to the vehicle seat.

In the position shown in FIGS. 2 and 4, both the stop hook 31 and the safety hook 32 are located in active rotary positions. In these rotary positions both the stop hook 31 and the safety hook 32 co-operate with the body portion 21. The stop unit 30 (and hence the seat to which it is attached) is prevented from moving longitudinally along the body portion 21 as a projection 36 provided on the stop hook 31 is engaged within one of a number of recesses 38 provided on the body portion 21.

In the embodiment shown in FIG. 1, a predetermined number of recesses 38 are provided at equally spaced intervals on the underside of the body portion 21.

The rotary positions shown in FIGS. 2 and 4 also prevent the lock unit 30 from being removed in the upward direction, away from the body portion 21.

The safety hook 32 is a similar shape to the stop hook 31, except that it is not provided with a projection corresponding to the projection 36 provided on the stop hook 31. This means that the safety hook 32 co-operates with the body portion 21, without engaging within any of the recesses 38.

The safety hook 32 is provided with a projection 40 on a surface that abuts an adjacent surface of the stop hook 31. This projection 40 couples the stop hook 31 and the safety hook 32 together, by extending through an arcuate slot 42 provided through the stop hook 31.

In the position shown in FIG. 5, the safety hook 32 is in the same position as in FIGS. 2 and 4, and the stop hook 31 is located in an unlocked position. Due to the unlocked position of the stop hook 31, and the nature of co-operation between the safety hook 32 and the body portion 21, the lock unit 30 is free to move longitudinally in either direction along the body portion 21. The position of a safety hook 32 also ensures that the lock unit 30 can not be removed in the upward direction, away from the body portion 21.

To unlock the stop hook 31, it is rotated about the pivot shaft 33 a distance sufficient to disengage the projection 36 from the relevant recess 38 in the body portion 21. The amount of rotation of the stop hook 31 is controlled by the adjacent upstanding wall 18 of the elongate channel member 16. The position of the upstanding wall 18 is such that it prevents the stop hook 31 completely disengaging from the body portion 21.

The arcuate slot 42 provided in the stop hook 31 ensures that rotation of the stop hook 31 about the pivot shaft 33, into an unlocked position, does not cause the safety hook 32 to rotate as well. Thus, the safety hook 32 remains in the same active rotary position, and, whilst allowing longitudinal movement, it does not allow the lock unit 30 to be removed in the upward direction, away from the body portion 21.

If the safety hook 32 were to rotate about the pivot shaft 33, it would be prevented from moving out of co-operation with the body portion 21 by the adjacent upstanding wall 18 of the elongate channel member 16. As with the stop hook 31, the adjacent side wall 18 would restrict the amount of rotation of the safety hook 32 about the pivot shaft 33.

Once the lock unit 30 (and the seat to which it is attached) has been moved to a desired position along the body portion 21, the lock unit 30 can be locked into position to prevent further longitudinal movement. The lock unit 30 is locked into position by rotating the stop hook 31 around the pivot shaft 33 so that the projection 36 engages in a suitable recess 38 on the body portion 21.

In the position shown in FIG. 6, both the stop hook 31 and the safety hook 32 are located in release positions. When the stop hook 31 and the safety hook 32 are located in these positions, the lock unit 30 can be removed in the upward direction, away from the body portion 21.

The stop hook 31 and the safety hook 32 can only be moved into these release positions when they are positioned at a predetermined point along the body portion 21. At this predetermined point, a portion of the upstanding wall 18 of the elongate channel member 16 is cut away.

In the embodiment shown in FIG. 1, the predetermined point to allow the release of the lock unit from the body portion 21 is at a far end of the body portion 21.

At this release point, the safety hook 32 can be rotated about the pivot shaft 33. The degree of rotation of the safety hook 32 is not restricted by the adjacent channel wall 18 as described earlier in the rotation of the stop hook 31. The safety hook 32 can hence be rotated a sufficient distance about the pivot shaft 33 to release the safety hook 32 from the body portion 21.

Whilst the safety hook 32 is rotated about the pivot shaft 33, the projection 40 moves along the arcuate slot 42 in the stop hook 31. When the projection reaches the end of the slot 42, continued rotation of the safety hook 32 causes the stop hook 31 to rotate as well. The two hooks 31, 32 of the lock unit 30 can thus be disengaged from the body portion 21, releasing the lock unit 30, and the seat to which it is attached, from the floor 14 of the vehicle.

An anchor assembly 110 according to a second embodiment of the invention is shown in FIG. 7.

The anchor assembly 110 includes an anchor unit 112 and a lock unit 130. An in the previous embodiment, the anchor unit 112 includes a generally U-shaped elongate channel member 116 having a base 117 and upstanding walls 118, 119.

The elongate channel member 116 can be fixedly connected to the floor 114 of a vehicle by any convenient fixing means. As in the previous embodiment, such fixing means may include bolts, rivets and/or welding.

The anchor unit 112 also includes an anchor member 120 located so that it extends longitudinally through and along the interior region of the elongate channel member 116, being spaced from the base 117 and upstanding walls 118, 119. The anchor member 120 shown in FIG. 7 is provided with a number of equidistantly spaced recesses 138 extending circumferentially about the anchor member 120.

The lock unit 130 that is shown in FIG. 7 includes an outer housing 128, through which a pivot shaft 136 having a generally D-shaped cross-section extends.

Figure 8:
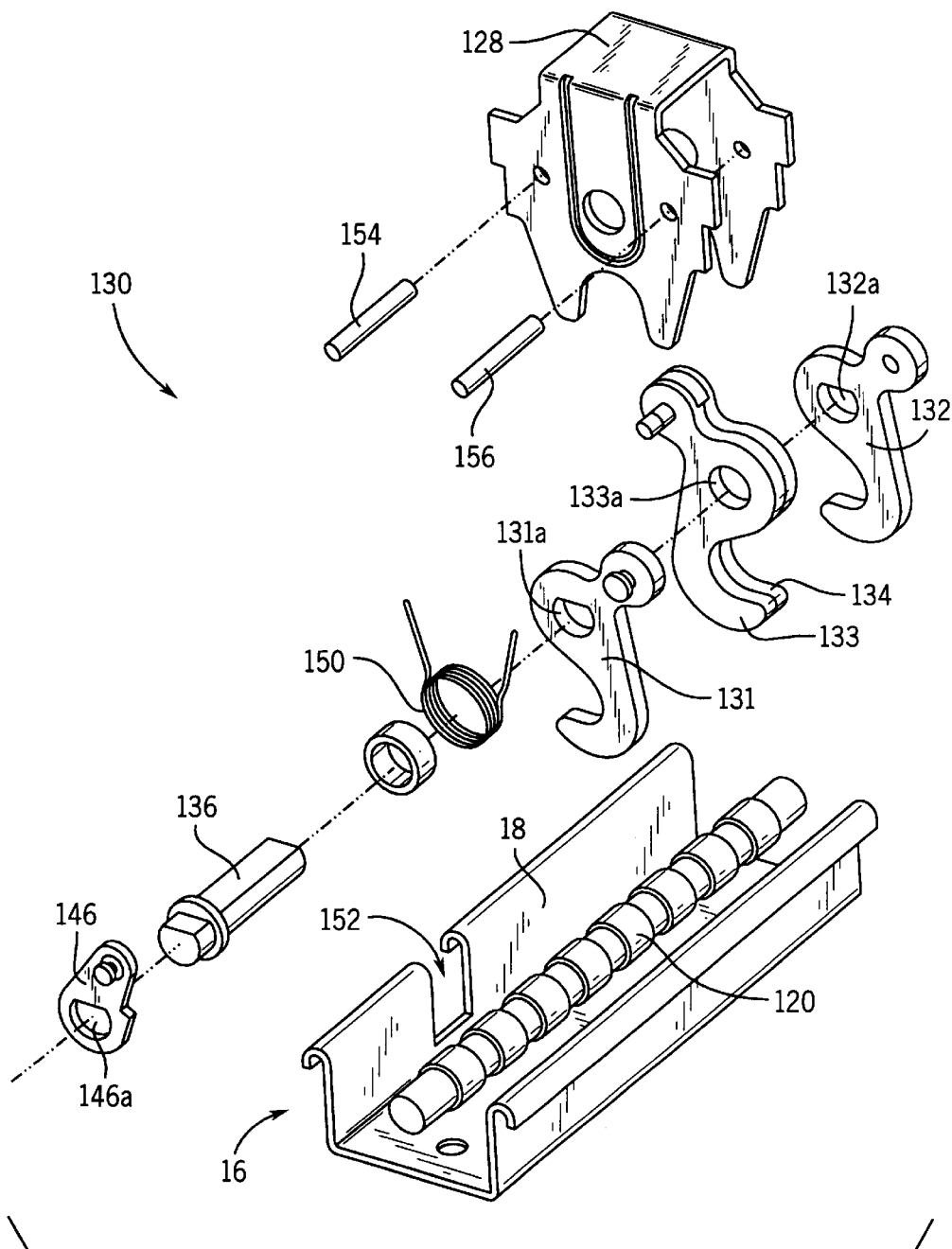
FIG. 8 is an exploded view of the anchor assembly of FIG. 7.

The lock unit 130 according to this embodiment of the invention is shown more clearly in FIG. 8.

As can be seen from FIG. 8, the lock unit 130 includes two stop hooks 131, 132 and two safety hooks 133, 134. These stop and safety hooks 131–134 are pivotally mounted on the pivot shaft 136. The apertures 131a, 132a through which the pivot shaft 136 extends in the stop hooks 131, 132 is of generally the same shape as the cross-section of the pivot shaft 136. The apertures 133a, 134a through which the pivot shaft extends in the safety hooks 133, 134 is generally circular.

These relative shapes ensure that rotation of the pivot shaft 136 causes the stop hooks 131, 132 to rotate also due to the engagement of the flat surface on the pivot shaft 136, against the flat surfaces of the apertures 131a, 132a. The safety hooks 133, 134 will not be caused to rotate, as the pivot shaft 136 will simply turn within the circular apertures 133a, 134a.

The stop and safety hooks 131—134 are mounted on the pivot shaft 136 so that the two safety hooks 133, 134 are side-by-side, 'sandwiched' between the two stop hooks 131, 132. The orientation of the stop hooks 131, 132 is opposite to the orientation of the safety hooks 133, 134. Hence the stop hooks 131, 132 engage about an opposite side of the anchor member 120 to the safety hooks 133, 134.

A torsion spring 150 is mounted on the pivot shaft 136 along with the stop and safety hooks 131–134. In use a first end of the torsion spring 150 is engaged behind a spring location peg 140 that extends through top corners of the stop hooks 131, 132. The other end of the torsion spring is located behind a spring location peg 142 that extends through corresponding top corners of the safety hooks 133, 134.

When the lock unit 130 is arranged so that the stop and safety hooks 131–134 co-operate with the anchor member 120, the spring bias of the torsion spring 150 urges the stop and safety hooks 131–134 into engagement around the anchor member 120.

The outer housing 128 of the lock unit 130 positions over the stop and safety hooks 131–134, the pivot shaft 136 extending through circular apertures 128a, 128b on either side of the housing 128. Recesses 142, 144 are but into either side of the outer housing 128 so that in use, the outer housing 128 straddles the anchor member 120.

A cable puller 146 is shown in FIG. 8 that can be used to attach a cable to the pivot shaft 136. This cable puller 146 is mounted on the pivot shaft 136 on the outside of a front face of the outer housing 128. The aperture 146a through which the pivot shaft extends in this cable puller 146 is generally D-shaped to ensure that when a cable attached to the cable puller 146 is pulled, it causes the pivot shaft 136 to rotate which in turn causes the stop hooks 131, 132 to rotate.

The cross-section of the pivot shaft 136, the apertures 131a, 132a in the stop hooks 131, 132 and the aperture 146a in the cable puller 146 need not be D-shaped, but could be any suitable shape that allows a driving force to be transferred to each of the components, without affecting the safety hooks 133, 134.

In the position shown in FIGS. 9 and 13, the stop hooks 131, 132 and the safety hooks 133, 134 are sprung biased by the rotary spring 150 in active rotary positions. The cable puller 146 is in its rest position. In these rotary positions both the stop hooks 131, 132 and the safety hooks 133, 134 co-operate with the anchor member 120. The lock unit 130 (and hence the seat to which it is attached) is prevented from moving along the anchor member 120 as the stop hooks 131, 132 are each engaged within one of the recesses 138 on the anchor member 120. These rotary positions of the stop and safety hooks 131–134 also prevent the lock unit 130 from being removed in the upward direction, away from the anchor member 120.

In the position shown in FIGS. 10, 11, 14 and 15, the cable puller has been pulled by some attachment means such as a cable causing it to rotate. This in turn has caused the pivot shaft 136 to rotate, so causing the stop hooks 131, 132 to pivot out of engagement with the respective recesses 138 on the anchor member 120. The safety hooks 133, 134 remain in the same position as shown in FIGS. 9 and 13.

The safety hooks 133, 134 are a similar shape to the stop hooks 131, 132, except that the safety hooks 133, 134 are shaped to provide a clearance between them and the recesses 138 on the anchor member 120.

In the unlocked position shown in FIGS. 10, 11, 14 and 15, the spring bias provided by the torsion spring 150 is increased. The stop hooks 131, 132 are retained in the unlocked position by a stop on the cable attachments of the cable that it attached to the cable puller 146. Track triggers are also released.

Thus, in the position shown in FIGS. 10, 11, 14 and 15, the lock unit 130 is free to move in either direction along the anchor member 120. The lock unit 130 is prevented from being removed from the anchor member 120 by the safety hooks 133, 134 that still co-operate with the anchor member 120.

The safety hooks 133, 134 are prevented from disengaging from the anchor member 120 by the position of the channel wall 118 relative to the safety hooks 133, 134. The channel wall 118 prevents the safety hooks 133, 134 from rotating a sufficient distance around the pivot shaft 136 to allow the safety hooks 133, 134 to disengage from the anchor member 120. In addition, a negative taper angle may be provided on faces of the safety hooks 133, 134, that slidably engage with the outermost surfaces of the anchor member 120. This negative taper angle helps to prevent the is safety hooks 133, 134 from disengaging with the anchor member 120.

When the lock unit 130 has been moved along the anchor member 120 to a desired position, the lock unit 130 can be locked into position by releasing the stop hooks 131, 132. The stop hooks 131, 132 and the track triggers are released by releasing the cable attached to the cable puller 150. The stop hooks 131, 132 hence return to a locked position in which they each engage within one of the recesses 138, as shown in FIGS. 12 and 16.

In the position shown in FIGS. 17 and 21, the lock unit 130 can be released from the anchor member 120. This is because the lock unit 130 has been moved along the anchor member 120 to a point that is adjacent a cut away portion 152 of the channel wall 18.

In this position, the cable attached to the cable puller 146 can be pulled to rotate the stop hooks 131, 132 out of engagement with the anchor member 120. A cable attached directly to the safety hooks can also be pulled to rotate the safety hooks 133, 134 about the pivot shaft 136, and out of engagement with the anchor member 120. In this position the safety hooks 133, 134 are not restricted by the channel wall 18, due to the cut away portion 152.

The maximum distance of rotation of the stop and safety hooks 131–134 is however restricted by hook stops 154, 156 that are engaged through the sides of the outer housing 128 of the lock unit 130. The maximum distance is large enough to allow the lock unit 130 to be lifted away from the anchor unit 112, as in FIGS. 19 and 23.

Hence in this position along the anchor member 120, the seat to which the lock unit 130 is secured can be released from the floor 114 of the vehicle.

To re-secure the seat to the floor 114 of the vehicle, the lock unit 130 needs to be brought back into contact with the anchor member 120 at the same point along the anchor member 120 as release was achieved. This position is shown in FIGS. 20 and 24.

In the position shown in FIGS. 20 and 24, both of the cables have been released and the stop and safety hooks 131–134 are closed together by the spring bias of the torque spring 150. However, a leading edge 158 on the bottom edges of each of the stop and safety hooks 131–134 allows the stop and safety hooks 131–134 to be forced open so that they can snap back around the anchor member 120.

The anchor assembly 110 of this embodiment thus provides an incremental seat adjustment mechanism that allows the occupants of a vehicle to safely adjust the positions of their seats whilst the vehicle is moving. The anchor assembly also allows total disengagement of the seat from the floor of the vehicle to provide a tilt and fold capacity, or to remove the seat from the vehicle.

The cable for rotating the safety hooks 133, 134 can be positioned in a position that is inaccessible by the occupants of a vehicle whilst the vehicle is moving.

This embodiment of the invention provides an incremental seat adjustment that is suitable for use in ISS applications. As seat belt anchorage is dependent upon seat integrity, it is essential that during driving, the occupants of a vehicle can adjust their seat whilst retaining a safe condition.

This embodiment of the invention also provides a seat adjustment mechanism in which the free-play movement of a vehicle seat is reduced when the seat is locked into position, and improved lateral retention of a vehicle seat when a vehicle is involved in a crash.

What is claimed is:

1. An anchor assembly for releaseably and adjustably securing a vehicle seat to the floor of a vehicle, comprising:
   an anchor unit configured to be secured to the floor of a vehicle, the anchor unit having an anchor member with at least one recess; and
   a lock unit configured to be secured to the base of a vehicle seat, the lock unit including a plurality of pivotally mounted lock members wherein at least one of the lock members is pivotal into and out of engagement with the at least one recess on the anchor member in order to secure the lock unit in a predetermined adjustment position; wherein the lock unit co-operates with the anchor member so that the lock unit is slidably adjustable along the anchor member; wherein the lock unit can be released from the anchor unit in at least one predetermined release position; and wherein at least one of the lock members co-operates with the anchor unit to retain the lock unit in co-operation with the anchor member during sliding movement of the lock member along the anchor member.

2. An anchor assembly as claimed in claim 1, wherein the anchor member is in the form of an elongate rod.

3. An anchor assembly as claimed in claim 2, wherein the elongate rod is provided with a plurality of recesses, equidistantly spaced along the length of the elongate rod.

4. An anchor assembly for releaseably and adjustably securing a vehicle seat to the floor of a vehicle, comprising:
   an anchor unit configured to be secured to the floor of a vehicle; and
   a lock unit configured to be secured to the base of a vehicle seat; wherein the lock unit co-operates with an anchor member in the anchor unit so that:
   the lock unit is slidably adjustable along the anchor member;
   the lock unit can be secured in at least one predetermined adjustment position; and
   the lock unit can be released from the anchor unit in at least one predetermined release position;
   wherein the anchor member is in the form of an elongate rod; and
   wherein the anchor unit includes a generally U-shaped elongate channel member having a base and upstanding walls, the elongate rod located so that it extends longitudinally through and along an interior region of the elongate channel member, spaced from the channel's base and upstanding walls.

5. An anchor assembly as claimed in claim 4, wherein the elongate rod has two legs for securement to the floor of a vehicle.

6. An anchor assembly as claimed in claim 8 wherein the upstanding walls of the elongate channel member are each provided with an outwardly extending flange to provide a bearing surface upon which a vehicle seat can be slidably seated.

7. An anchor assembly for releaseably and adjustably securing a vehicle seat to the floor of a vehicle, comprising:

an anchor unit configured to be secured to the floor of a vehicle; and a lock unit configured to be secured to the base of a vehicle seat; wherein the lock unit co-operates with an anchor member in the anchor unit so that:

the lock unit is slidably adjustable along the anchor member;

the lock unit can be secured in at least one predetermined adjustment position; and the lock unit can be released from the anchor unit in at least one predetermined release position;

wherein the lock unit includes at least two pivotally mounted lock members;

wherein at least one of the lock members co-operates with the anchor member to retain the lock unit in co-operation with the anchor member during sliding movement of the lock member along the anchor member, except when the lock unit is located at a predetermined release position; and wherein the anchor member is in the form of an elongate rod and wherein at least one of the lock members is retained in co-operation with the anchor member in the form of an elongate rod, during sliding movement of the lock unit along the elongate rod, by at least one upstanding wall of an elongate channel member, except when the lock unit is located at the predetermined release position.

8. An anchor assembly as claimed in claim 7, wherein a release position is defined by a cutaway portion in the upstanding wall of the elongate channel member that otherwise retains at least one of the lock members in co-operation with the elongate rod, allowing all of the lock members to be pivoted out of co-operation with the anchor member.

9. An anchor assembly as claimed in claim 1, wherein the lock unit includes at least two lock members, each in the form of a hook, mounted on a pivot shaft in the lock unit, the pivot shaft being arranged to lie parallel to the anchor member.

10. An anchor assembly for releaseably and adjustably securing a vehicle seat to the floor of a vehicle, comprising:

an anchor unit configured to be secured to the floor of a vehicle; and a lock unit configured to be secured to the base of a vehicle seat; wherein the lock unit co-operates with an anchor member in the anchor unit so that:

the lock unit is slidably adjustable along the anchor member;

the lock unit can be secured in at least one predetermined adjustment position; and the lock unit can be released from the anchor unit in at least one predetermined release position;

wherein the lock unit includes at least two lock members, each in the form of a hook, mounted on a pivot shaft in the lock unit, the pivot shaft being arranged to lie parallel to the anchor member, and wherein at least one of the lock members is releaseably engageable within a recess on the anchor member, and is provided with a projection so that when the lock member is pivoted into engagement with the recess the projection engages within the recess.

11. An anchor assembly as claimed in claim 10, wherein the hooks are coupled together.

12. An anchor assembly as claimed in claim 11, wherein one of the hooks includes a projection that projects outwards from a side face of the hook that is adjacent to a side face of another hook, and extends through an arcuate slot provided through the other hook.

13. An anchor assembly as claimed in claim 1, wherein the lock unit includes four lock members, each in the form of a hook, pivotally mounted on a pivotal axis within a lock unit body housing.

14. An anchor assembly as claimed in claim 13, wherein the lock unit body housing includes stops that determine the maximum amount of rotation of the hooks about their pivotal axis.

15. An anchor assembly as claimed in claim 14, wherein the hooks are sprung biased relative to each other.

16. An anchor assembly as claimed in claim 15, wherein the spring bias is provided by a torsion spring.

17. An anchor assembly for releaseably and adjustably securing a vehicle seat to the floor of a vehicle, comprising:

an anchor unit configured to be secured to the floor of a vehicle; and a lock unit configured to be secured to the base of a vehicle seat; wherein the lock unit co-operates with an anchor member in the anchor unit so that:

the lock unit is slidably adjustable along the anchor member;

the lock unit can be secured in at least one predetermined adjustment position; and the lock unit can be released from the anchor unit in at least one predetermined release position;

wherein the lock unit includes four lock members, each in the form of a hook, pivotally mounted on a pivot shaft within a lock unit body housing; and wherein the pivot shaft on which the hooks are pivotally mounted has a cross-sectional shape that corresponds to the shape of apertures through which the pivot shaft extends in the at least two of the hooks; and apertures through which the pivot shaft extends in the other two hooks are circular.

18. An anchor assembly as claimed in claim 17, wherein the cross-sectional shape of the pivot shaft and the correspondingly shaped apertures in the hooks are generally D-shaped.

19. An anchor assembly as claimed in claim 18, wherein a cable puller is located on the pivot shaft.

* * * * *